US012046919B2

(12) United States Patent
Arai

(10) Patent No.: US 12,046,919 B2
(45) Date of Patent: Jul. 23, 2024

(54) CONTACTLESS POWER FEEDING DEVICE

(71) Applicant: TOSHIBA TEC KABUSHIKI KAISHA, Tokyo (JP)

(72) Inventor: Seishirou Arai, Izunokuni Shizuoka (JP)

(73) Assignee: Toshiba Tec Kabushiki Kaisha, Tokyo (JP)

(*) Notice: Subject to any disclaimer, the term of this patent is extended or adjusted under 35 U.S.C. 154(b) by 65 days.

(21) Appl. No.: 17/881,065

(22) Filed: Aug. 4, 2022

(65) Prior Publication Data
US 2022/0376557 A1 Nov. 24, 2022

Related U.S. Application Data

(63) Continuation of application No. PCT/JP2021/025420, filed on Jul. 6, 2021.

(30) Foreign Application Priority Data

Jul. 28, 2020 (JP) ................. 2020-127447

(51) Int. Cl.
H02J 50/40 (2016.01)
B62B 5/00 (2006.01)
(Continued)

(52) U.S. Cl.
CPC ............... *H02J 50/40* (2016.02); *B62B 5/00* (2013.01); *B62B 3/184* (2013.01); *H02J 50/10* (2016.02)

(58) Field of Classification Search
CPC ........ H02J 50/40; H02J 50/10; H02J 7/00045; H02J 50/005; H02J 50/402; H02J 50/90;
(Continued)

(56) References Cited

U.S. PATENT DOCUMENTS 5,526,916 A * 6/1996 Amdahl ................ G07F 7/0627
194/211
6,024,203 A * 2/2000 Amdahl .................. A47F 10/04
340/568.5
(Continued)

FOREIGN PATENT DOCUMENTS

JP 2006-101577 A 4/2006
JP 2008-117102 A 5/2008
(Continued)

OTHER PUBLICATIONS

English Translation of International Search Report dated Feb. 3, 2022, mailed in counterpart International Application No. PCT/JP2021/025420, 2 pages.
(Continued)

Primary Examiner — Daniel Kessie
Assistant Examiner — Brian K Baxter
(74) Attorney, Agent, or Firm — Kim & Stewart LLP

(57) ABSTRACT

A contactless power feeding device of an embodiment includes: a placement portion on which a plurality of carts including a device and a power receiving unit that receives power to be fed to the device is placed in a state of being arranged in one direction; a power transmitting unit that is provided at each of placement positions at which the cart is placed in the placement portion and transmits power to the power receiving unit by contactless power feeding; a lock unit that is provided at each of at least a first placement position at which a first cart in the one direction is placed and a second placement position at which a next cart is placed among the placement positions, and locks movement of the cart; and a control unit that controls an operation of the lock unit.

5 Claims, 8 Drawing Sheets

(51) Int. Cl.
*B62B 3/18* (2006.01)
*H02J 50/10* (2016.01)

(58) Field of Classification Search
CPC ... H02J 7/00; B62B 5/00; B62B 3/184; B62B 3/1404; B62B 5/0056; B62B 3/14; Y02T 10/70; Y02T 10/7072; B60Y 2200/86
See application file for complete search history.

(56) References Cited

U.S. PATENT DOCUMENTS

| | | | |
|---|---|---|---|
| 11,283,299 B2* | 3/2022 | Kato | B60L 53/30 |
| 2006/0244588 A1* | 11/2006 | Hannah | B62B 3/1412 |
| | | | 340/539.13 |
| 2008/0116033 A1 | 5/2008 | Sonnendorfer et al. | |
| 2009/0050441 A1* | 2/2009 | Wanzl | G07F 7/0636 |
| | | | 194/353 |
| 2009/0315302 A1 | 12/2009 | Gray | |
| 2012/0143401 A1* | 6/2012 | Jayadevappa | E05B 47/0012 |
| | | | 701/2 |
| 2018/0009459 A1* | 1/2018 | Johnson | B62B 5/0046 |
| 2019/0207427 A1* | 7/2019 | McNeally | H02J 7/35 |
| 2020/0079412 A1* | 3/2020 | Ramanathan | G06Q 20/322 |
| 2020/0122762 A1* | 4/2020 | Kato | H02J 50/40 |
| 2020/0127505 A1* | 4/2020 | Kato | B62B 3/1404 |
| 2020/0198679 A1 | 6/2020 | Ogishima | |
| 2020/0254895 A1* | 8/2020 | Kim | H02J 7/0047 |
| 2020/0298898 A1* | 9/2020 | Ogishima | H02J 50/40 |
| 2021/0001741 A1* | 1/2021 | Miyoshi | G06K 7/10881 |
| 2021/0001910 A1* | 1/2021 | Enomoto | H02J 7/0047 |
| 2021/0001911 A1* | 1/2021 | Kogoshi | H02J 50/005 |
| 2021/0135504 A1* | 5/2021 | Kato | H02J 7/02 |
| 2022/0166263 A1* | 5/2022 | Kato | H02J 50/90 |
| 2022/0237392 A1 | 7/2022 | Rössl | |
| 2023/0058244 A1* | 2/2023 | Katabira | H02J 50/40 |

FOREIGN PATENT DOCUMENTS

| | | |
|---|---|---|
| JP | 2008-528361 A | 7/2008 |
| JP | 2020-102930 A | 7/2020 |
| WO | 2020/249232 A1 | 12/2020 |

OTHER PUBLICATIONS

Examination Report mailed Jun. 19, 2023, in corresponding Indian Patent Application No. 202247045636, 5 pages.

* cited by examiner

CONTACTLESS POWER FEEDING DEVICE

CROSS-REFERENCE TO RELATED APPLICATIONS

This application is a continuation application of International Application No. PCT/JP2021/025420, filed Jul. 6, 2021, which designates the United States, and which claims the benefit of priority from Japanese Patent Application No. 2020-127447, filed Jul. 28, 2020, the entire contents of which are incorporated herein by reference.

FIELD

Embodiments described herein relate generally to a contactless power feeding device.

BACKGROUND

Conventionally, in a retail store such as a supermarket, a so-called shopping cart is used for a customer to carry a product to be purchased. It is possible to improve convenience by attaching a device such as a product registration device that reads product information that can identify a product to such a cart.

In a case where device is attached to the cart, it is necessary to charge power used by the device. As one of charging methods, a method of charging by contactless power feeding is considered. For example, conventionally, a technique has been proposed in which a contactless power feeding device is provided in a parking lot of carts to perform charging while the cart is parked.

DETAILED DESCRIPTION

According to one embodiment, a contactless power feeding device includes:

a placement portion on which a plurality of carts including a device and a power receiving unit that receives power to be fed to the device is placed in a state of being arranged in one direction;

a power transmitting unit that is provided at each of placement positions at which the cart is placed in the placement portion and transmits power to the power receiving unit by contactless power feeding;

a lock unit that is provided at each of at least a first placement position at which a first cart in the one direction is placed and a second placement position at which a next cart is placed among the placement positions, and locks movement of the cart; and a control unit that controls an operation of the lock unit, wherein the control unit releases a locked state of the lock unit provided at the first placement position while maintaining the locked state of the lock unit provided at the second placement position when receiving supply instruction of the cart.

Hereinafter, an embodiment of a contactless power feeding device will be described in detail with reference to the accompanying drawings. Note that the embodiment described below is an embodiment of a contactless power feeding device, and does not limit the configuration, specification, and the like. The contactless power feeding device of the present embodiment is an application example to a contactless power feeding device that feeds power in a contactless manner to a cart on which a product registration device is mounted in a retail store.

Figure 1:
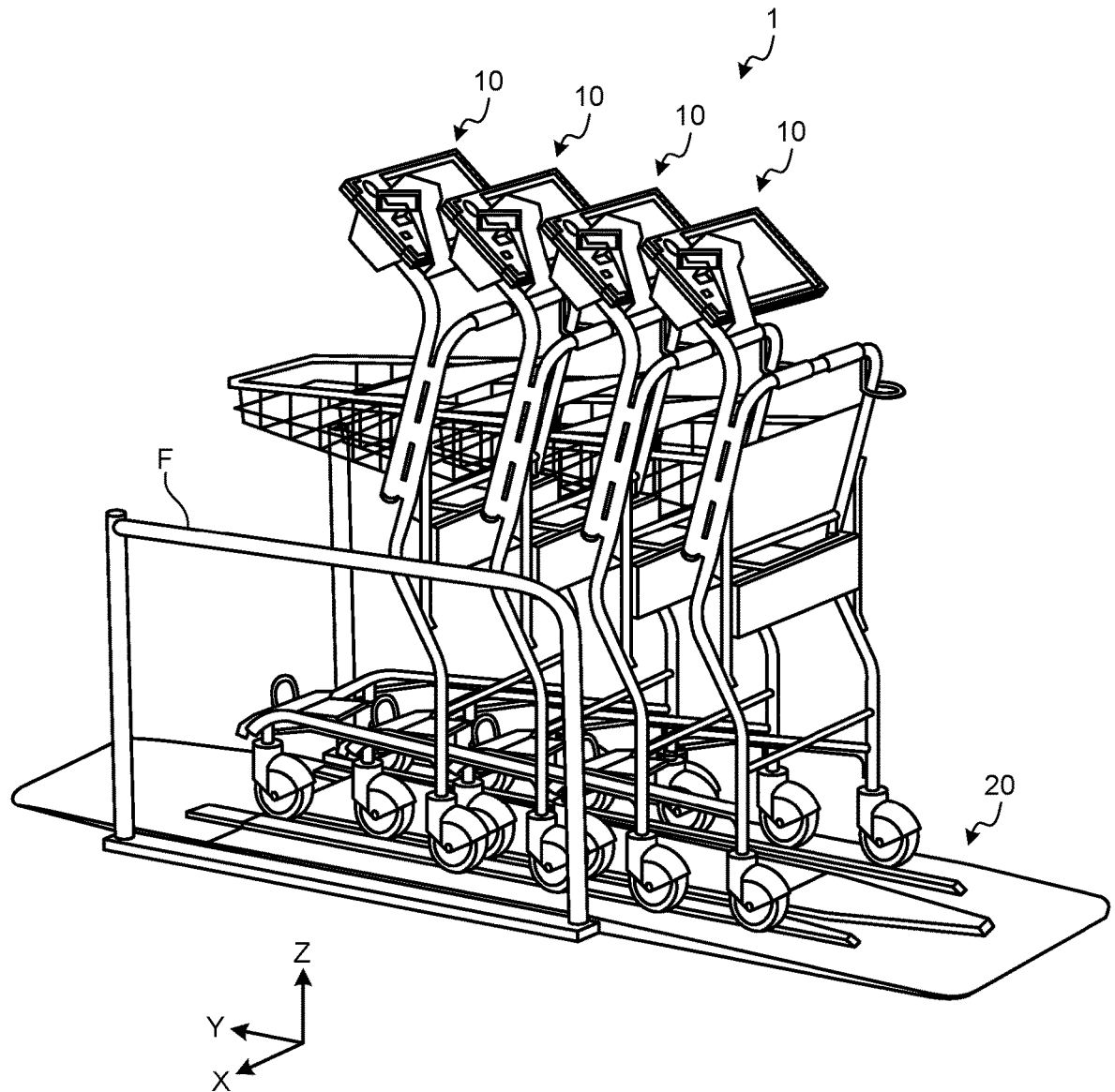
FIG. 1 is a perspective view illustrating an example of a contactless power feeding system according to the present embodiment.

FIG. 1 is a perspective view illustrating an example of a contactless power feeding system according to the present embodiment. A contactless power feeding system 1 includes a cart 10 and a contactless power feeding device 20. FIG. 1 illustrates a case where the contactless power feeding device 20 is installed on a floor surface of a cart return where a cart 10 is placed in a retail store. In the cart return, an iron frame F for aligning the cart 10 is provided. In the following drawings, it is assumed that the cart 10 enters the contactless power feeding device 20 in the Y direction.

The cart 10 travels in the Y direction from the right side of FIG. 1 and enters the contactless power feeding device 20. The cart 10 is placed on the contactless power feeding device 20 and then discharged in the Y direction in the drawing.

In addition, in FIG. 1, four carts 10 are placed on the contactless power feeding device 20, but the number of carts 10 that can be placed on the contactless power feeding device 20 is not limited to four. For example, the contactless power feeding device 20 may be configured to be able to place five or more carts 10.

Figure 2:
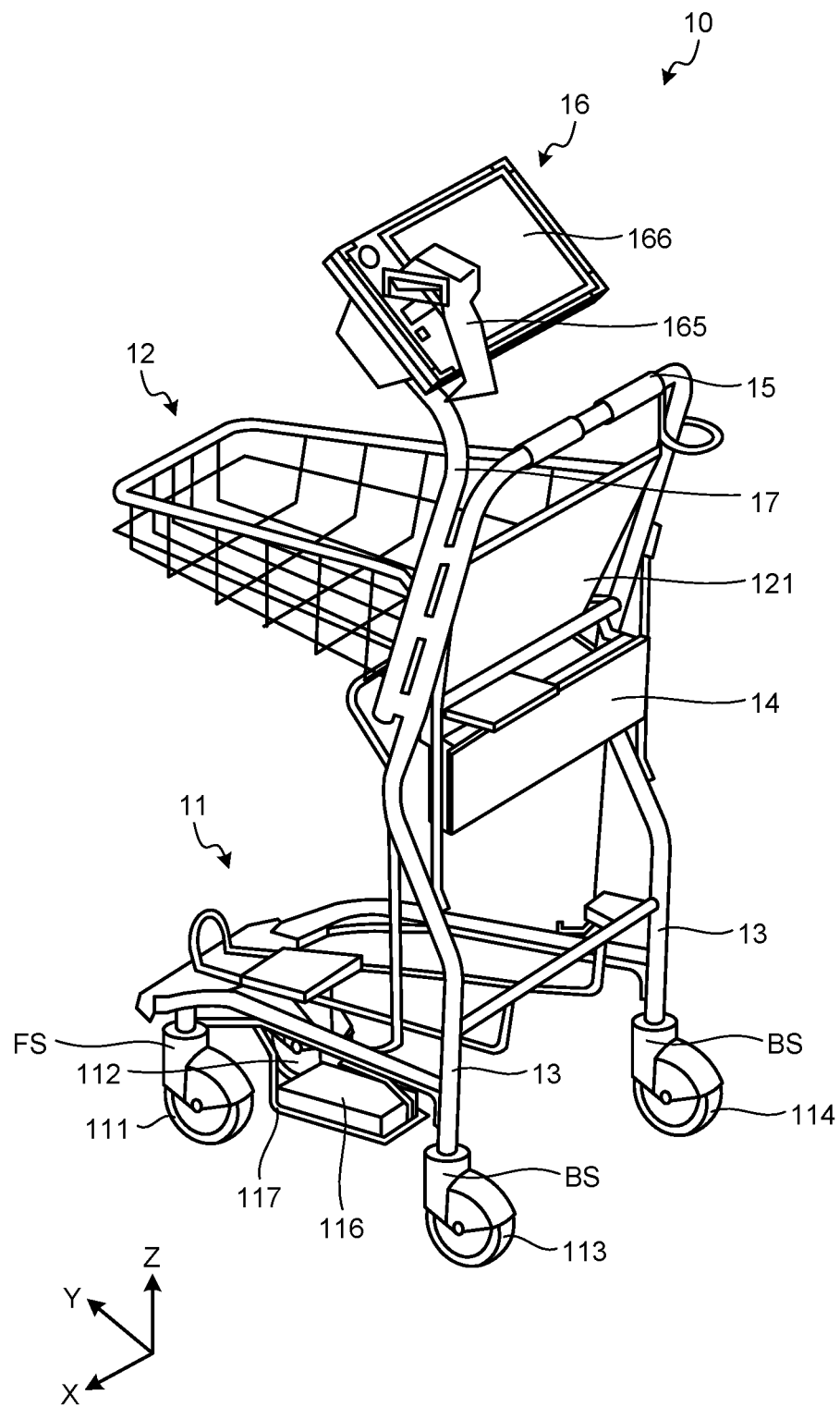
FIG. 2 is a perspective view illustrating an example of a cart.

FIG. 2 is a perspective view illustrating an example of a cart. The cart 10 is loaded with a product to be purchased collected by a customer in a retail store such as a supermarket. The cart 10 is a wagon that moves by hand of the user.

The cart 10 includes a base portion 11 for movement. The base portion 11 includes a pair of front wheels 111 and 112 and a pair of rear wheels 113 and 114 as wheels of the cart 10. The front wheels 111 and 112 are rotatably supported by a front wheel support portion FS. The rear wheels 113 and 114 are rotatably supported by a rear wheel support portion BS.

The interval between the front wheel 111 and the front wheel 112 is narrower than the interval between the rear wheels 113 and 114. In addition, an attachment portion 117 to which a power receiving unit 116 that receives power by contactless power feeding is attached is disposed below the base portion 11. The power receiving unit 116 is disposed substantially horizontally.

A basket-like storing portion 12 having an open upper surface is disposed above the base portion 11. The storing portion 12 is supported by a support column 13 extending from the base portion 11. In the storing portion 12, a surface 121 on the rear side in the entry direction of the cart 10 can be opened and closed. Therefore, as illustrated in FIG. 1, by inserting the storing portion 12 of the subsequent cart 10 into the storing portion 12 of the cart 10, it is possible to accumulate more carts 10 in a small area.

Note that the cart 10 does not have to include the storing portion 12 by itself. For example, the cart 10 may have a basket receiving unit that receives a product basket storing products, and the product basket received by the basket receiving unit may be used as the storing portion 12.

In addition, a holder 14 that stores a secondary battery (not illustrated) is disposed below the storing portion 12. The secondary battery is a battery that charges the power received by the power receiving unit 116.

In addition, the support column 13 includes a handle portion 15 gripped by a customer who moves the cart 10. In addition, the support column 13 is attached with a support portion 17 that supports a product registration device 16 that registers a product to be sold.

The product registration device 16 is a device that registers a product to be sold. The product registration device 16 includes a scanner 165 and a display unit 166. The scanner 165 reads product information of a product to be sold. For example, the scanner 165 reads a product code that can identify a product indicated by a barcode and the like.

The display unit 166 is, for example, a touch panel display. The display unit 166 displays, for example, a product read by the scanner 165. In addition, the product registration device 16 is driven by using the power charged in the secondary battery stored in the holder 14.

Figure 3:
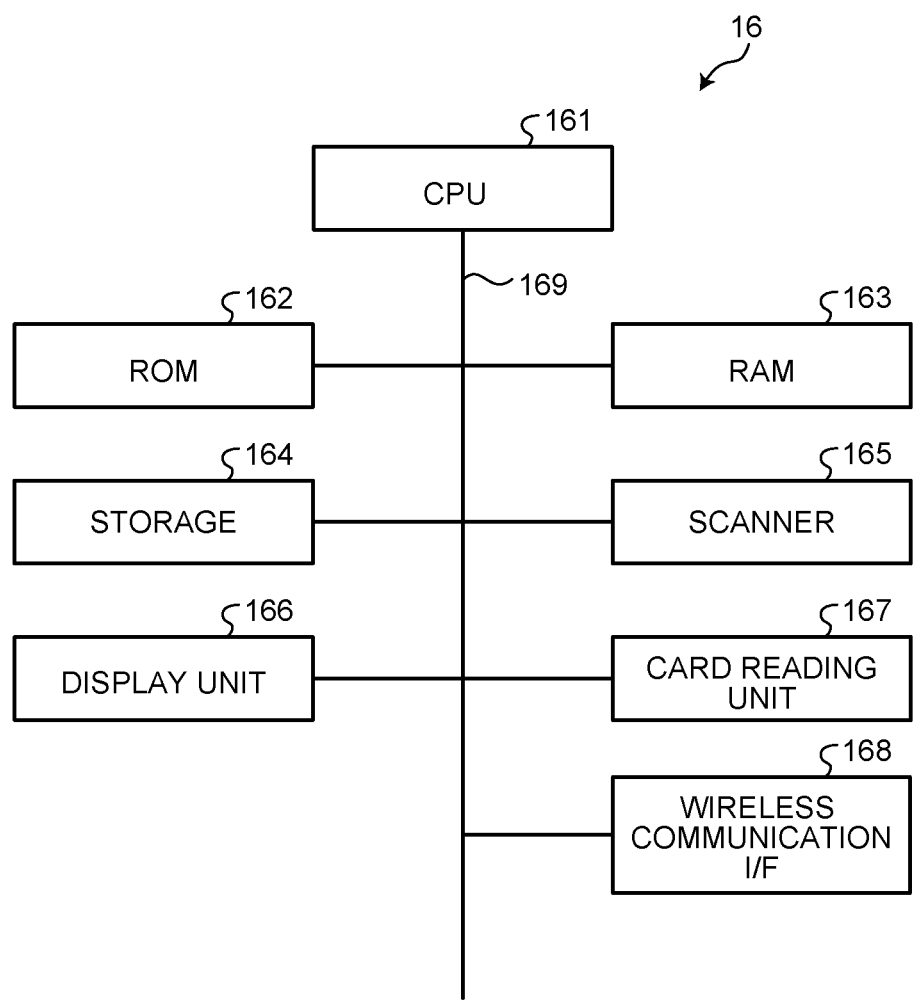
FIG. 3 is a block diagram illustrating an example of a hardware configuration of a product registration device.

In addition, the product registration device 16 incorporates a card reading unit 167 (see FIG. 3). The card reading unit 167 is a reader device (reader/writer device) that performs near field communication (NFC) with a contactless IC tag and the like.

When an article capable of near field communication (hereinafter, referred to as a communicable object) is held over the upper portion of the display unit 166, the card reading unit 167 communicates with the communicable object. The card reading unit 167 reads information stored in the communicable object.

The communicable object is, for example, an IC card (member card) including an IC tag. The card reading unit 167 reads, for example, a membership number and the like (hereinafter, also referred to as member identification information) allocated in advance to identify the shopper. The product registration device 16 transmits the read identification information to a server (not illustrated) connected by wireless communication via a wireless communication I/F 168 (see FIG. 3).

The server refers to member information (member identification information and the like) registered in advance, and checks whether there is member information that matches the member identification information read by the card reading unit 167. In a case where there is information that matches the member identification information read by the card reading unit 167, the server transmits a notification indicating that the authentication of the user has succeeded to the product registration device 16 that is the transmission source of the member identification information.

The product registration device 16 transmits, to the contactless power feeding device 20, a notification indicating that the authentication of the user has succeeded, with information (hereinafter, also referred to as cart identification information) for identifying the product registration device 16 with the member card held over via the wireless communication I/F 168. Note that the server may transmit, to the contactless power feeding device 20, a notification indicating that the authentication of the user has succeeded with the cart identification information.

In addition, in a case where the product registration device 16 receives a notification indicating that the authentication of the user has succeeded from the server, the member identification information read by the card reading unit 167 is associated with the cart identification information and stored in a memory 164 (see FIG. 3) of the product registration device 16 as association information. This association information is used at the time of payment or the like.

Next, a hardware configuration of the product registration device 16 will be described. FIG. 3 is a block diagram illustrating an example of a hardware configuration of the product registration device 16.

The product registration device 16 includes a central processing unit (CPU) 161, a read only memory (ROM) 162, a random access memory (RAM) 163, the memory 164, the scanner 165, the display unit 166, the card reading unit 167, and the wireless communication I/F 168. The CPU 161 and each component are connected via a system bus 169. Note that description of the scanner 165, the display unit 166, and the card reading unit 167 described above is omitted.

The CPU 161 executes various types of arithmetic processing to integrally control the operation of the product registration device 16. The ROM 162 stores programs executed by the product registration device 16, setting information, and the like. The RAM 163 temporarily stores various data. The RAM 163 is used as a work area of the CPU 161, and develops various programs and various data stored in the ROM 162 and the memory 164.

The memory 164 is a storage device capable of holding stored contents even when the power is turned off. As the memory 164, for example, a flash memory and the like are used. The memory 164 stores an operation program of the product registration device 16, various setting information, and the like. In addition, the memory 164 stores the above-described association information.

In the present embodiment, the CPU 161 controls each unit by developing and executing an operation program stored in the ROM 162 or the memory 164 in the work area of the RAM 163.

The wireless communication I/F 168 is a communication interface for performing communication with an external device such as the contactless power feeding device 20 or a server according to a predetermined wireless communication standard such as a wireless local area network (LAN). In addition, the wireless communication I/F 168 is also an interface for performing signal communication using contactless power feeding.

Figure 4:
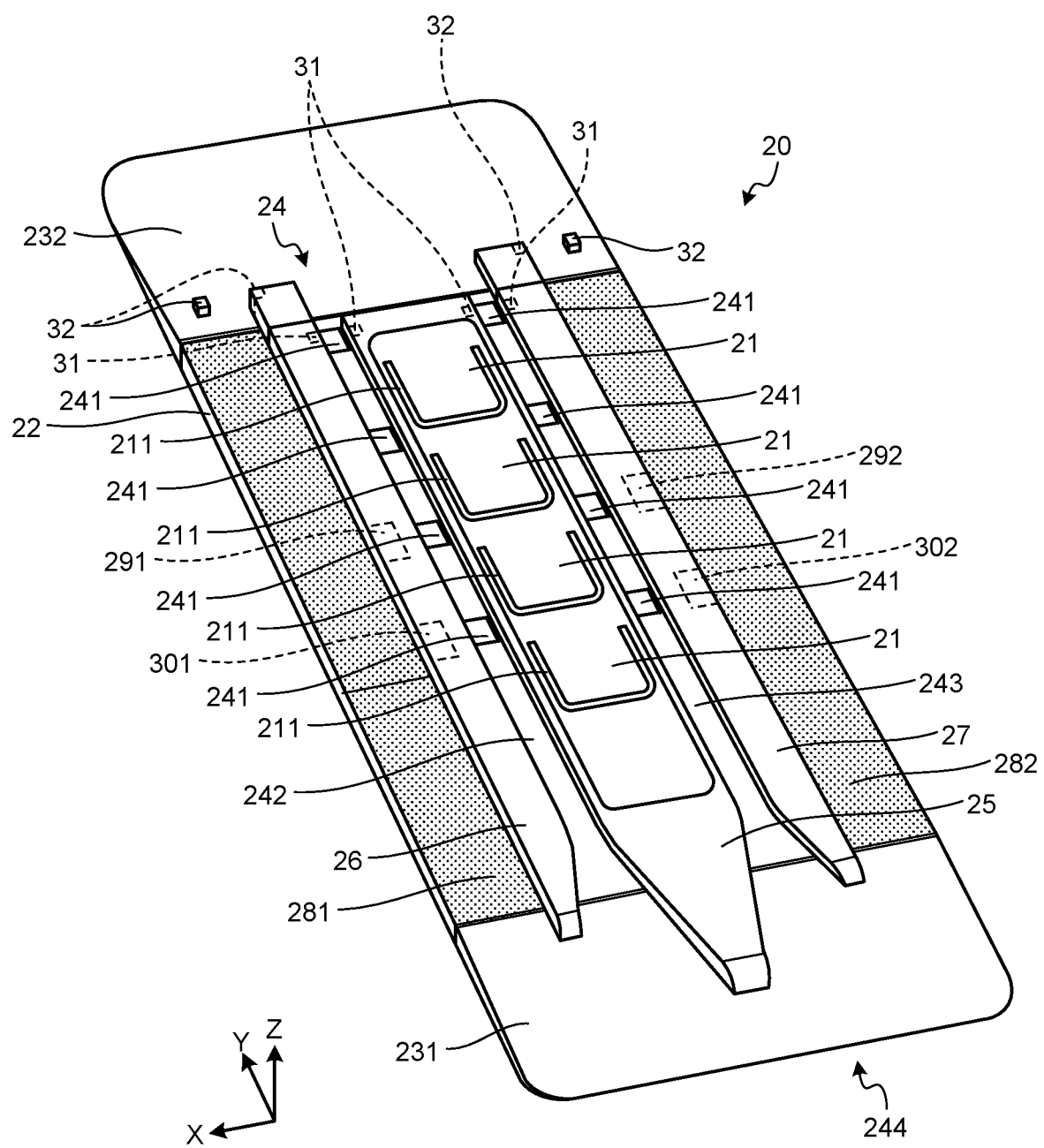
FIG. 4 is a perspective view illustrating an example of the contactless power feeding device.
Figure 5:
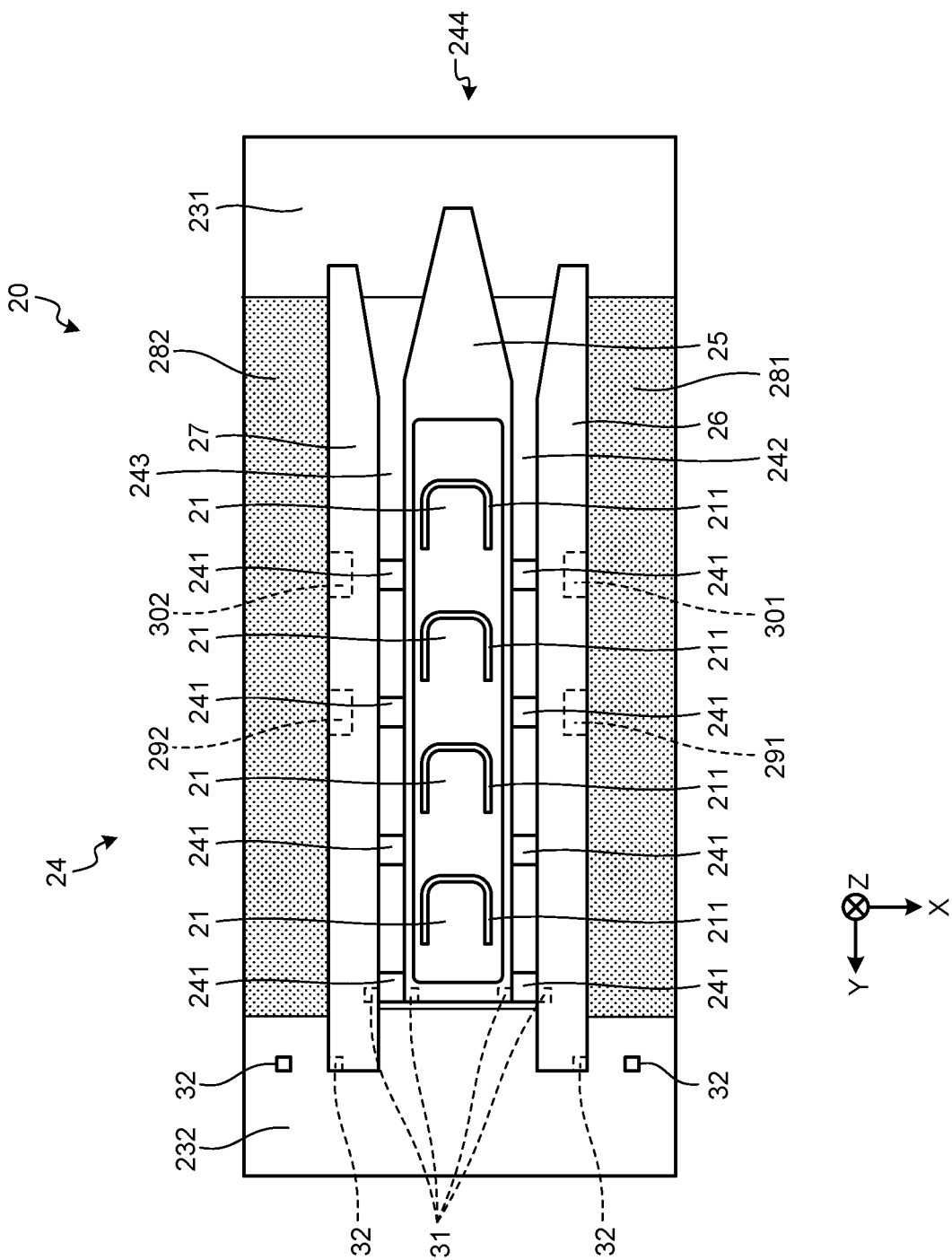
FIG. 5 is a top view illustrating an example of the contactless power feeding device.

Next, the contactless power feeding device 20 will be described. FIG. 4 is a perspective view illustrating an example of the contactless power feeding device 20. FIG. 5 is a top view illustrating an example of the contactless power feeding device 20. The contactless power feeding device 20 includes a placement portion 24, a first inclined portion 231, and a second inclined portion 232.

The placement portion 24 is an area in which the cart 10 including the product registration device 16 and the power receiving unit 116 that receives power supplied to the product registration device 16 is placed. The placement portion 24 includes a power transmitting unit 21. The power transmitting unit 21 transmits power to the power receiving unit 116 of the cart 10 placed on the placement portion 24 by contactless power feeding.

The power transmitting unit 21 is installed substantially horizontally at a position facing the power receiving unit 116 of the cart 10 placed on the placement portion 24, and generates a magnetic field in the vertical direction. In this manner, the power transmitting unit 21 transmits power to the power receiving unit 116 of the cart 10 by contactless power feeding. As a method of the contactless power feeding, various methods such as an electromagnetic induction type and a magnetic field resonance type are known, but various methods can be used.

In the present embodiment, the term "contactless" is used as power transmission performed wirelessly. Therefore, even if the power transmitting unit 21 and the power receiving unit 116 are in contact with each other at the time of power feeding for some reason regardless of the intention, if power transmission is performed wirelessly, it is assumed that power is fed in a contactless manner.

In addition, the power transmitting unit 21 can perform signal communication using contactless power feeding with the power receiving unit 116 of the cart 10. As a result, the power transmitting unit 21 can acquire the cart identification information and the like from the power receiving unit 116, for example.

In addition, the placement portion 24 includes a plate-like housing 22 and belt conveyors 281 and 282. The housing 22 incorporates a plurality of power transmitting units 21 and drive units (not illustrated) of the belt conveyors 281 and 282. The rear wheel 113 of the cart 10 is placed on the upper surface of the belt conveyor 281, and the rear wheel 114 of the cart 10 is placed on the upper surface of the belt conveyor 282.

The belt conveyors 281 and 282 convey the rear wheels 113 and 114 of the cart 10 placed on the upper surface in the Y direction by driving the drive unit, conveying the cart 10 in the Y direction. The belt conveyors 281 and 282 are examples of a "conveyance unit". The contactless power feeding device 20 may not include the belt conveyors 281 and 282. In this case, the user manually takes out the cart 10 from the placement portion 24.

The contactless power feeding device 20 includes a light emitting unit 211 around the power transmitting unit 21. The light emitting unit 211 emits light in a case where the power receiving unit 116 is located at a position facing the power transmitting unit 21. As a result, the manager and the like of the retail store can identify whether or not the charging is being performed by contactless power feeding. FIGS. 4 and 5 illustrate the contactless power feeding device 20 including four power transmitting units 21 and light emitting units 211.

The number of power transmitting units 21 is equal to the number of carts 10 that can be placed on the contactless power feeding device 20 in a manner that one power transmitting unit 21 can charge one cart 10. The light emitting units 211 are also provided as many as the number of the carts 10 that can be placed on the contactless power feeding device 20 in a manner that the power transmission state of each power transmitting unit 21 can be individually checked.

In addition, in order to dispose the power transmitting unit 21 and the power receiving unit 116 at positions facing each other, first, the cart 10 needs to be placed at an appropriate position in the width direction orthogonal to the entry direction of the cart 10, that is, the X-axis direction.

The contactless power feeding device 20 includes a central wheel guiding unit 25, a first side surface wheel guiding unit 26, and a second side surface wheel guiding unit 27. The central wheel guiding unit 25 is a convex portion disposed substantially at the center of the contactless power feeding device 20. In addition, the central wheel guiding unit 25 extends from the entry side of the cart 10 to the end of the placement portion 24 on which the cart 10 is placed. In addition, the width of the central wheel guiding unit 25 increases from the entry side of the cart 10 toward the placement portion 24.

The central wheel guiding unit 25 has substantially the same width as the width from the front wheel 111 to the front wheel 112 of the cart 10 in the placement portion 24. With such a shape, the central wheel guiding unit 25 determines the position in the width direction of the front wheels 111 and 112 of the cart 10. That is, the central wheel guiding unit 25 determines the position of the cart 10 in the X-axis direction in the contactless power feeding device 20.

The first side surface wheel guiding unit 26 and the second side surface wheel guiding unit 27 are convex portions disposed laterally with respect to the entry direction of the cart 10 in the central wheel guiding unit 25. In addition, the first side surface wheel guiding unit 26 and the second side surface wheel guiding unit 27 extend from the entry side of the cart 10 to the end of the placement portion 24 on which the cart 10 is placed. In addition, the width of the first side surface wheel guiding unit 26 and the second side surface wheel guiding unit 27 increases from the entry side of the cart 10 toward the placement portion 24.

In addition, the first side surface wheel guiding unit 26 has substantially the same width as the width from the front wheel 111 to the rear wheel 113 of the cart 10 in the placement portion 24. The second side surface wheel guiding unit 27 has substantially the same width as the width from the front wheel 112 to the rear wheel 114 of the cart 10 in the placement portion 24.

An interval from the inside of the first side surface wheel guiding unit 26 to the central wheel guiding unit 25 has substantially the same width as the width of the front wheel 111. The interval from the inside of the second side surface wheel guiding unit 27 to the central wheel guiding unit 25 has substantially the same width as the width of the front wheel 112.

The width from the outside of the first side surface wheel guiding unit 26 to the outside of the second side surface wheel guiding unit 27 is substantially the same as the width from the rear wheel 113 to the rear wheel 114 of the cart 10. With such a shape, the first side surface wheel guiding unit 26 and the second side surface wheel guiding unit 27 determine the positions in the width direction of the front wheels 111 and 112 and the rear wheels 113 and 114 of the cart 10.

Therefore, the central wheel guiding unit 25, the first side surface wheel guiding unit 26, and the second side surface wheel guiding unit 27 can determine the position of the cart 10 in the width direction in the contactless power feeding device 20 in a case where the cart 10 is placed on the placement portion 24. That is, the contactless power feeding device 20 can determine the position of the cart 10 in the X-axis direction.

The width of the gap between the central wheel guiding unit 25 and the first side surface wheel guiding unit 26 is substantially the same as the width of the front wheel 111. The front wheel 111 guided by the central wheel guiding unit 25 and the first side surface wheel guiding unit 26 travels through a gap between the central wheel guiding unit 25 and the first side surface wheel guiding unit 26. That is, the central wheel guiding unit 25 and the first side surface wheel guiding unit 26 form a first front wheel traveling path 242 on which the front wheel 111 of the cart 10 travels.

Similarly, the width of the gap between the central wheel guiding unit 25 and the second side surface wheel guiding unit 27 is substantially the same as the width of the front wheel 112. The front wheel 112 guided by the central wheel guiding unit 25 and the second side surface wheel guiding unit 27 travels through a gap between the central wheel guiding unit 25 and the second side surface wheel guiding unit 27. That is, the central wheel guiding unit 25 and the second side surface wheel guiding unit 27 form a second front wheel traveling path 243 on which the front wheel 112 of the cart 10 travels.

Furthermore, the width of the central wheel guiding unit 25, the first side surface wheel guiding unit 26, and the second side surface wheel guiding unit 27 increases from the entry side of the cart 10 toward the placement portion 24.

In other words, the first front wheel traveling path 242 and the second front wheel traveling path 243 have substantially the same width as the width of the front wheels 111 and 112 in the placement portion 24, but the portion entering the first front wheel traveling path 242 and the second front wheel traveling path 243 expands in the width direction. In addition, the central wheel guiding unit 25, the first side surface wheel guiding unit 26, and the second side surface wheel guiding unit 27 have a convex shape.

That is, the placement portion 24 includes the first front wheel traveling path 242 and the second front wheel traveling path 243, which are traveling paths of the wheels of the cart 10, in which the width in the direction orthogonal to the entry direction decreases as the cart 10 advances from the entry side on which the cart 10 enters. In addition, the placement portion 24 includes an entry portion 244 of the first front wheel traveling path 242 and the second front wheel traveling path 243.

In this manner, the central wheel guiding unit 25, the first side surface wheel guiding unit 26, and the second side surface wheel guiding unit 27 guide the front wheels 111 and 112 of the cart 10. Therefore, the user can easily cause the cart 10 to travel on the first front wheel traveling path 242 and the second front wheel traveling path 243 by pushing the cart 10 from the entry side of the contactless power feeding device 20.

The first side surface wheel guiding unit 26 and the second side surface wheel guiding unit 27 protrude to the second inclined portion 232 to be described later by about the diameters of the rear wheels 113 and 114 of the cart 10.

Figure 6:
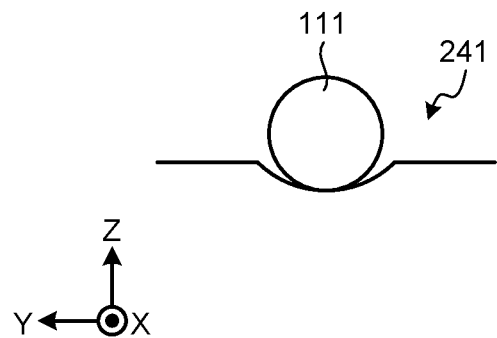
FIG. 6 is a cross-sectional view illustrating an example of a cross section of a positioning unit of the contactless power feeding device.

The first front wheel traveling path 242 and the second front wheel traveling path 243 are provided with a positioning unit 241 that determines the position of the cart 10 in the entry direction. The positioning unit 241 locks the wheels of the cart 10, that is, the front wheels 111 and 112. FIG. 6 is a cross-sectional view illustrating an example of a cross section of the positioning unit 241 of the contactless power feeding device 20.

As illustrated in FIG. 6, the positioning unit 241 is, for example, a concave portion having a smooth curve. In this manner, since the positioning unit 241 has a concave shape, the front wheels 111 and 112 are disposed on the rolling bottom surface. Thus, the positioning unit 241 can determine the positions of the front wheels 111 and 112. That is, the contactless power feeding device 20 can determine the position of the placement portion 24 in the entry direction of the cart 10.

Note that the power transmitting unit 21 and the light emitting unit 211 are disposed at positions based on the placement position of the cart 10 positioned by the positioning unit 241.

Furthermore, as illustrated in FIG. 6, the positioning unit 241 has a smooth curve. Therefore, in a case where the cart 10 passes through the positioning unit 241, it is possible to reduce the load of the user pushing the cart 10. Note that the positioning unit 241 is not limited to a concave portion having a smooth curve, and may be a simple concave portion having no curve. Furthermore, the positioning unit 241 may be a convex portion having a smooth curve, or may be a simple convex portion having no curve.

Furthermore, as illustrated in FIG. 1, by inserting the storing portion 12 of the subsequent cart 10 into the storing portion 12 of the cart 10, the cart 10 can accumulate more carts 10 in a small area. Therefore, the interval between the positioning unit 241 and the positioning unit 241 disposed on the rear side in the entry direction of the cart 10 with respect to the positioning unit 241 is shorter than the entire length in the entry direction of the cart 10.

With the above configuration, the contactless power feeding device 20 can easily dispose the cart 10 at a position where the power receiving unit 116 and the power transmitting unit 21 face each other.

It is preferable that the contactless power feeding device 20 be installed in a manner that the entrance of a retail store is located on the left side in FIG. 1 and the exit is located on the right side in FIG. 1. As a result, it is possible to prevent the cart 10 that has just been returned and has a short charging time from being erroneously taken out by a user.

In addition, the contactless power feeding device 20 includes stoppers 291, 292, 301, and 302. The stoppers 291 and 301 are provided in the first side surface wheel guiding unit 26. The stoppers 292 and 302 are provided in the second side surface wheel guiding unit 27.

The stopper 291 causes the cylinder to protrude in front of the rear wheel support portion BS of the rear wheel 113 of the cart 10 placed at the first placement position where the first cart 10 in the Y direction is placed. The stopper 292 causes the cylinder to protrude in front of the rear wheel support portion BS of the rear wheel 114 of the cart 10 similarly placed at the first placement position. As a result, the stoppers 291 and 292 lock the movement of the cart 10 at the first placement position.

In addition, the stoppers 301 and 302 cause the cylinders to protrude in front of the rear wheel support portions BS of the rear wheels 113 and 114 of the cart 10 placed at the second placement position where the cart 10 next to the cart 10 placed at the first placement position is placed, and lock the forward movement of the cart 10 at the second placement position. The stoppers 291, 292, 301, and 302 are examples of "lock units".

Here, the stoppers 291, 292, 301, and 302 will be described in detail. Here, the stopper 291 will be described as an example, but the configuration of the stoppers 292, 301, and 302 are similar to that of the stopper 291.

Figure 7:
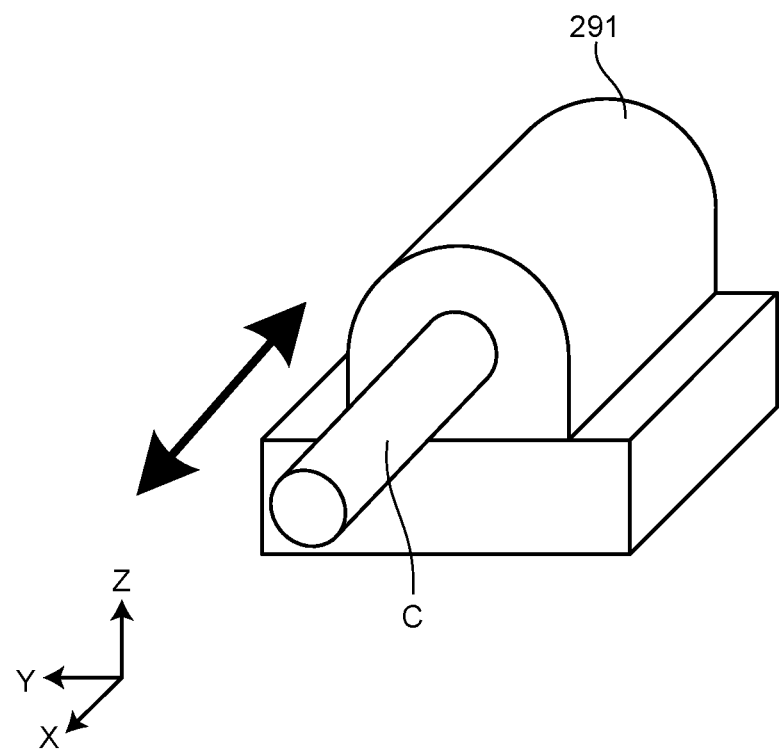
FIG. 7 is an explanatory diagram illustrating an example of a configuration of a stopper of the contactless power feeding device.

FIG. 7 is an explanatory diagram illustrating an example of a configuration of the stopper 291 of the contactless power feeding device 20. The stopper 291 includes a cylinder C. The cylinder C is stored inside the stopper 291 when the stopper 291 is in the unlocked state.

When the stopper 291 is in a locked state by the control of a lock control unit 2003 to be described later, the cylinder C protrudes from the inside of the stopper 291 in the outside direction (X direction) of the first side surface wheel guiding unit 26.

When the cylinder C protrudes in the outside direction from the first side surface wheel guiding unit 26, the side surface of the cylinder C and the front portion of the rear wheel support portion BS of the rear wheel 113 of the cart 10 placed on the first placement portion come into contact with each other. As a result, even if the rear wheel 113 rotates, the cart is blocked by the cylinder C and cannot progress in the Y direction, and the forward movement of the cart 10 is locked.

As a result, it is possible to prevent the cart 10 to be placed at the first placement position from being pushed out by the belt conveyors 281 and 282.

The shape of the cylinder C may be a shape in which the rear wheel support portion BS is sandwiched between the front and the rear. With such a shape, not only the movement of the cart 10 in the forward direction but also the movement in the rearward direction can be locked. In addition, the above is an example of a method of locking the movement of the cart 10 by the stoppers 291, 292, 301, and 302, and the method of locking the movement of the cart 10 is not limited to the above method.

The stoppers 291 and 292 are provided in a manner that the power transmitting unit 21 at the first placement position faces the power receiving unit 116 of the cart 10 placed at the first placement position at a position where the side surfaces of the cylinders C protruding from the stoppers 291 and 292 are in contact with the front sides of the rear wheel support portions BS of the rear wheels 113 and 114 of the cart 10 at the first placement position.

As a result, the contactless power feeding device 20 can determine the position of the cart 10 in the entry direction at the first placement position, similarly to the positioning unit 241 at the first placement position. In addition, the stoppers 301 and 302 can similarly determine the position of the cart 10 in the entry direction at the second placement position.

Furthermore, the cart 10 placed behind the second placement position on the placement portion 24 is also conveyed by the belt conveyors 281 and 282 to a position where the cart 10 placed at the previous placement position prevents the cart from proceeding. As a result, each of the power transmitting units 21 faces the power receiving unit 116 of the cart 10 placed at each placement position.

Therefore, even in a case where the positioning unit 241 is not provided, the contactless power feeding device 20 can charge each of the plurality of carts 10 at an appropriate position.

In addition, the contactless power feeding device 20 includes a sensor 31 and a sensor 32. The sensor 31 is provided near the positioning unit 241 at the first placement position of the placement portion 24, and detects that the cart 10 is placed at the first placement position of the placement portion 24. The sensor 31 is, for example, an optical sensor including a light emitting unit and a light receiving unit.

In the present embodiment, the light emitting unit of the sensor 31 is provided near the end portion of the central wheel guiding unit 25 in a state of being capable of emitting light in the outside direction. The light receiving unit of the sensor 32 is provided at a position facing the light emitting unit of the sensor 32, and receives light emitted from the light emitting unit of the sensor 32. In this example, the light receiving unit of the sensor 32 is provided inside the first side surface wheel guiding unit 26 and the second side surface wheel guiding unit 27 in a state of being able to receive the light emitted from the light emitting unit of the sensor 31.

Here, a case where the cart 10 is placed at the first placement position of the placement portion 24 is considered. In this case, the light emitted from the light emitting unit of the sensor 31 is blocked by the front wheel 111 or 112, and the light receiving unit cannot receive the light.

Therefore, the sensor 31 can detect whether or not the cart 10 is placed at the first placement position of the placement portion 24 by detecting that the light is blocked. Note that the sensor 31 may be any sensor that can detect that the cart 10 is placed, and is not limited to an optical sensor.

The sensor 32 is provided near the end portion of the first side surface wheel guiding unit 26 and near the end portion of the second side surface wheel guiding unit 27, and detects that the rear wheels 113 and 114 of the cart 10 placed at the first placement position of the placement portion 24 are pushed out from the placement portion 24. In other words, the sensor 32 detects discharge of the cart 10 placed at the first placement position of the placement portion 24. The sensor 32 is, for example, an optical sensor similar to the sensor 31.

In the present embodiment, the light emitting unit of the sensor 32 is provided near the end portion of the first side surface wheel guiding unit 26 and near the end portion of the second side surface wheel guiding unit 27 in a state of being capable of emitting light in the outside direction. The light receiving unit of the sensor 32 is provided at a position facing the light emitting unit of the sensor 32, and receives light emitted from the light emitting unit of the sensor 32.

The light receiving unit of the sensor 32 is provided at a position where the rear wheel 113 (rear wheel 114) of the cart 10 can pass through a gap between the first side surface wheel guiding unit 26 (second side surface wheel guiding unit 27) and the light receiving unit of the sensor 32.

Here, a case where the cart 10 is discharged from the placement portion 24 by the belt conveyors 281 and 282 will be considered. In this case, the light emitted from the light emitting unit of the sensor 32 is blocked by the rear wheel 113 or 114 of the cart 10.

Therefore, by detecting that the light is blocked, the sensor 32 can detect that the cart 10 placed at the first placement position of the placement portion 24 is discharged. Note that the sensor 32 only needs to be a sensor capable of detecting discharge of the cart 10 placed at the first placement position of the placement portion 24, and is not limited to an optical sensor.

In addition, the contactless power feeding device 20 includes a control unit 200 (see FIG. 8) that controls the entire operation of the contactless power feeding device 20. The control unit 200 will be described later.

Next, the first inclined portion 231 will be described. The contactless power feeding device 20 has a thickness because the power transmitting unit 21 and the drive units of the belt conveyors 281 and 282 are incorporated in the housing 22.

Therefore, in order to place the cart 10 on the placement portion 24 of the contactless power feeding device 20 without lifting the cart 10, an inclination rising from the floor surface on which the contactless power feeding device 20 is installed to the placement portion 24 on which the cart 10 is placed is necessary. Therefore, the first inclined portion 231 is provided on the entry side of the contactless power feeding device 20 where the cart 10 enters. With this configuration, the cart 10 can smoothly enter the contactless power feeding device 20.

Next, the second inclined portion 232 will be described. As described above, the housing 22 has a thickness. In a case where there is no inclination on the discharge side on which the cart 10 is discharged, the cart 10 falls from the placement portion 24 onto the floor surface when the cart 10 is discharged from the placement portion 24. When the cart 10 falls on the floor surface, the product registration device 16 and the like of the cart 10 may be broken by the impact.

Therefore, in order to alleviate the impact generated by the discharge of the cart 10, an inclination lowering from the placement portion 24 to the floor surface on which the contactless power feeding device 20 is installed is necessary. Therefore, the second inclined portion 232 is provided on the discharge side of the contactless power feeding device 20 where the cart 10 is discharged. With this configuration, the cart 10 can be smoothly discharged from the contactless power feeding device 20.

Specifically, the cart 10 pushed out of the placement portion 24 by the belt conveyors 281 and 282 goes down the second inclined portion 232 and is supplied to the user.

Figure 8:
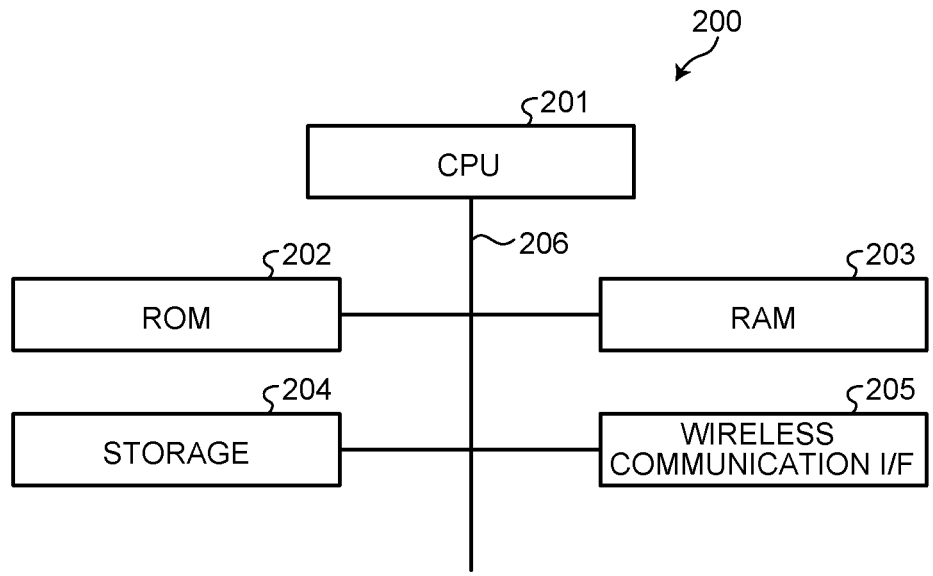
FIG. 8 is a block diagram illustrating an example of a hardware configuration of a control unit of the contactless power feeding device.

Next, a hardware configuration of the control unit 200 of the contactless power feeding device 20 will be described. FIG. 8 is a block diagram illustrating an example of a hardware configuration of the control unit 200 of the contactless power feeding device 20. The control unit 200 includes a CPU 201, a ROM 202, a RAM 203, a memory 4, and a wireless communication I/F 205. The CPU 201 and each component are connected via a system bus 206.

The CPU 201 executes various types of arithmetic processing to integrally control the operation of the contactless power feeding device 20. The ROM 202 stores programs executed by the contactless power feeding device 20, setting information, and the like.

The RAM 203 functions as a work area and the like of the CPU 201. A memory 204 is a storage device capable of holding stored contents even when the power is turned off. As the memory 204, for example, a flash memory and the like are used. The memory 204 stores an operation program of the contactless power feeding device 20, various setting information, and the like.

In the present embodiment, the CPU 201 controls each unit by developing and executing an operation program stored in the ROM 202 or the memory 204 in the work area of the RAM 203.

The wireless communication I/F 205 is a communication interface for performing communication with an external device such as the product registration device 16 or a server according to a predetermined wireless communication standard such as a wireless LAN. In addition, the wireless communication I/F 205 is also an interface for performing signal communication using contactless power feeding.

Figure 9:
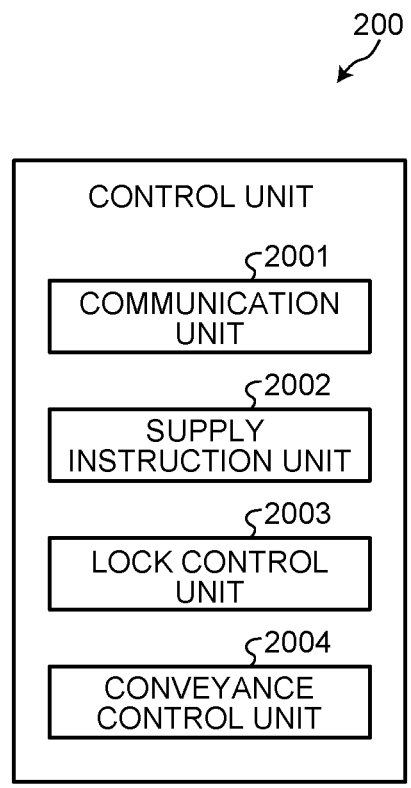
FIG. 9 is a block diagram illustrating an example of a functional configuration of the control unit of the contactless power feeding device.

Next, a functional configuration of the control unit 200 of the contactless power feeding device 20 will be described. FIG. 9 is a block diagram illustrating an example of a functional configuration of the control unit 200 of the contactless power feeding device 20. The control unit 200 includes a communication unit 2001, a supply instruction unit 2002, the lock control unit 2003, and a conveyance control unit 2004 as functional units.

The communication unit 2001 communicates with an external device such as the product registration device 16 or a server via the wireless communication I/F 205. For example, the communication unit 2001 receives a notification indicating that the authentication of the user has succeeded from the product registration device 16. Note that the communication unit 2001 may receive a notification indicating that the authentication of the user has succeeded from the server.

In a case where a notification indicating that the authentication of the user has succeeded is successful is received from the external device, the supply instruction unit 2002 issues a supply instruction of the cart 10. In the present embodiment, in a case where a notification indicating that the authentication of the user has succeeded is received from the product registration device 16 of the cart 10, the supply instruction unit 2002 issues a supply instruction of the cart 10. Note that, as described above, information for identifying the product registration device 16 holding the member card is attached to the notification indicating that the authentication of the user has succeeded.

In other words, the user instructs the contactless power feeding device 20 to supply the cart 10 by holding the member card of the user over the display unit 166 of the product registration device 16.

Note that, in the present embodiment, the user holds his/her member card over the product registration device 16 to issue a supply instruction of the cart 10 to the contactless power feeding device 20, but the method of the supply instruction of the cart 10 is not limited to this. For example, a supply button of the cart 10 may be provided in the contactless power feeding device 20, and when the user presses the supply button, the supply instruction unit 2002 may issue a supply instruction of the cart 10.

By the way, there may be a case where the user holds the member card over the display unit 166 of the product registration device 16 of the cart 10 placed on the placement portion 24 other than the first placement position. Also in this case, if the cart 10 at the first placement position is discharged, the user needs to hold the member card over the product registration device 16 of the discharged cart 10 again in order to make the product registration device 16 usable.

Furthermore, there is also a problem that the cart identification information of the cart 10 not used by the user is associated with the member identification information of the user.

Therefore, the contactless power feeding device 20 according to the present embodiment acquires the cart identification information using signal communication that uses the contactless power feeding, and stores the cart identification information and the placement position of the cart 10 in association with each other in the memory 204 and the like, in a manner that the above situation can be avoided.

For example, in a case where the communication unit 2001 receives a notification indicating that the authentication of the user has succeeded, to which the cart identification information different from the cart identification information associated with the first placement position is attached, the communication unit 2001 transmits a notification indicating that the member card is held over the product registration device 16 of the cart 10 placed at a position other than the first placement position to the product registration device 16 that has transmitted the notification indicating that the authentication of the user has succeeded, via the wireless communication I/F 205.

Upon receiving the notification, the product registration device 16 displays, on the display unit 166, a message prompting the user to hold the member card over the product registration device 16 of the cart 10 placed at the first placement position. In this case, the cart identification information is not associated with the member information of the user.

Specifically, for example, consider a case where the communication unit 2001 newly places the cart 10 at the second placement position in a state where the cart 10 is placed only at the first placement position. In this case, when the power transmitting unit 21 at the second placement position starts power transmission to the power receiving unit 116 of the cart 10, the cart identification information of the cart 10 placed at the second placement position is acquired by signal communication using contactless power feeding. The acquired cart identification information is stored in the memory 204 in association with the second placement position.

Note that, in a case where the cart 10 is moved, the information in which the placement position and the cart identification information are associated with each other is updated. For example, in a case where the first placement position is associated with the cart identification information "123", and the second placement position is associated with the cart identification information "124", when the cart 10 placed at the first placement position is discharged, the cart 10 on which the product registration device 16 identified by "124" is mounted moves to the first placement position.

At this time, the power transmitting unit 21 at the first placement position acquires cart identification information "124" when starting power transmission to the power receiving unit 116 of the cart 10. The acquired cart identification information "124" is stored in the memory 204 in association with the first placement position (information in which the first placement position and the cart identification information "123" are associated is overwritten). As a result, the information in which the placement position and the cart identification information are associated with each other is updated.

The lock control unit 2003 controls operations of the stoppers 291, 292, 301, and 302. For example, when receiving the supply instruction of the cart 10, the lock control unit 2003 releases the locked state of the stoppers 291 and 292 provided at the first placement position while maintaining the locked state of the stoppers 301 and 302 provided at the second placement position. The lock control unit 2003 is an example of a "control unit".

Specifically, in a case where an instruction to supply the cart 10 is issued from the supply instruction unit 2002, the lock control unit 2003 controls the stoppers 291 and 292 while maintaining the state in which the cylinders C of the stoppers 301 and 302 protrude in the outside direction from the first side surface wheel guiding unit 26 and the second side surface wheel guiding unit 27, and stores the cylinders C inside the stoppers 291 and 292. As a result, the contactless power feeding device 20 can supply only the cart 10 placed at the first placement position to the user.

In addition, in a case where the cart 10 is discharged, the lock control unit 2003 controls the stoppers 291 and 292 at the first placement position to enter the locked state, and controls the stoppers 301 and 302 at the second placement position to enter the unlocked state.

Specifically, in a case where the discharge of the cart 10 is detected by the sensor 31, the lock control unit 2003 controls the stoppers 291 and 292 at the first placement position, and causes the cylinder C to protrude in the outside direction from the first side surface wheel guiding unit 26 and the second side surface wheel guiding unit 27 to be in the locked state.

In addition, in a case where discharge of the cart 10 is detected by the sensor 31, the lock control unit 2003 controls the stoppers 301 and 302 at the second placement position to store the cylinders C inside the stoppers 301 and 302 and to be in the unlocked state. As a result, the contactless power feeding device 20 can move the carts 10 placed at the respective placement positions one by one to the previous placement positions after discharging the cart 10 placed at the first placement position.

Note that the lock control unit 2003 may perform the above processing on the assumption that the cart 10 has been discharged when a predetermined time has elapsed since the supply instruction has been issued from the supply instruction unit 2002.

In addition, in the present embodiment, in a case where the sensor 32 detects that the cart 10 is placed at the first placement position, the lock control unit 2003 controls the stoppers 301 and 302 to cause the cylinders C to protrude in the outside direction from the first side surface wheel guiding unit 26 and the second side surface wheel guiding unit 27, and brings the stoppers 301 and 302 at the second placement position into the locked state.

The conveyance control unit 2004 controls driving of the belt conveyors 281 and 282. For example, when receiving the supply instruction of the cart 10, the conveyance control unit 2004 drives the drive units of the belt conveyors 281 and 282 to discharge the first cart 10 from the placement portion 24. The conveyance control unit 2004 is an example of a "control unit".

In addition, in a case where the cart 10 is placed on the first placement portion, the conveyance control unit 2004 stops driving of the belt conveyors 281 and 282. Specifically, in a case where the sensor 32 detects that the cart 10 is placed at the first placement position, the conveyance control unit 2004 controls the drive units of the belt conveyors 281 and 282 to stop the conveyance of the cart 10. As a result, the belt conveyors 281 and 282 are not unnecessarily continuously driven.

Note that the conveyance control unit 2004 may perform the above processing on the assumption that the cart 10 is placed at the first placement position when a predetermined time has elapsed since the lock control unit 2003 brings the stoppers 301 and 302 at the second placement position into the unlocked state.

Figure 10:
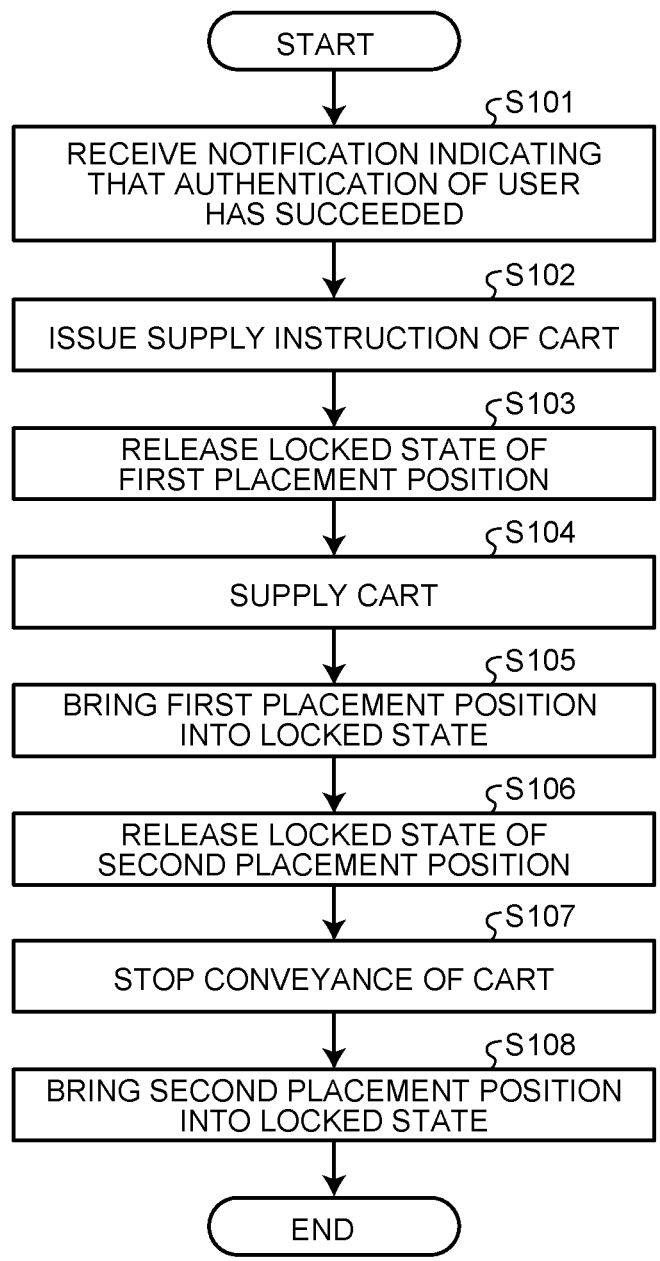
FIG. 10 is a flowchart illustrating an example of processing of the control unit of the contactless power feeding device.

Here, an example of the operation of the contactless power feeding device 20 will be described. FIG. 10 is a flowchart illustrating an example of processing of the control unit 200 of the contactless power feeding device 20.

First, the communication unit 2001 receives a notification indicating that the authentication of the user has succeeded from the product registration device 16 (step S101). The supply instruction unit 2002 issues a supply instruction of the cart 10 (step S102). The lock control unit 2003 controls the stoppers 291 and 292 to store the cylinders C inside the stoppers 291 and 292, and releases the locked state of the first placement position (step S103).

At this time, the stoppers 301 and 302 are maintained in a locked state in which the cylinders C protrude in the outside direction from the first side surface wheel guiding unit 26 and the second side surface wheel guiding unit 27, and the movement of the cart 10 placed at the second placement position in the Y direction is locked.

The conveyance control unit 2004 drives the belt conveyors 281 and 282 to convey the cart 10 at the first placement position, pushes out the cart 10 from the placement portion 24, and supplies the cart 10 to the user (step S104).

When the sensor 31 detects that the cart 10 is placed on the placement portion 24 at the first placement position, the lock control unit 2003 controls the stoppers 291 and 292 to cause the cylinders C to protrude to the outside of the first side surface wheel guiding unit 26 and the second side surface wheel guiding unit 27 (step S105).

When the sensor 32 detects discharge of the cart 10 placed at the first placement position of the placement portion 24, the lock control unit 2003 controls the stoppers 301 and 302, stores the cylinders C inside the stoppers 301 and 302, and releases the locked state (step S106).

When the sensor 31 detects that the cart 10 is placed on the placement portion 24 at the first placement position, the conveyance control unit 2004 controls the drive units of the belt conveyors 281 and 282 to stop the conveyance of the cart 10 (step S107). The lock control unit 2003 controls the stoppers 301 and 302 to cause the cylinders C to protrude in the outside direction from the first side surface wheel guiding unit 26 and the second side surface wheel guiding unit 27, and ends the present processing (step S108).

As described above, the contactless power feeding device 20 according to the present embodiment includes: the placement portion 24 on which the plurality of carts 10 including the product registration device 16 and the power receiving unit 116 that receives power to be fed to the product registration device 16 is placed in a state of being arranged in one direction; the power transmitting unit 21 that is provided at each of placement positions at which the cart 10 is placed in the placement portion 24 and transmits power to the power receiving unit 116 by contactless power feeding; stoppers 291, 292, 301, and 302 that are provided at each of at least the first placement position at which the first cart 10 in the one direction is placed and the second placement position at which the next cart 10 is placed among the placement positions, and lock movement of the cart 10; and the lock control unit 2003 that releases the locked state of the stoppers 291 and 292 provided at the first placement position while maintaining the locked state of the stoppers 301 and 302 provided at the second placement position when receiving supply instruction of the cart 10.

As a result, when the user instructs the supply, the locked state of the cart 10 at the first placement position is released, and thus, for example, even if the cart 10 at the first placement position is not fully charged, the user can freely take out the cart 10. Furthermore, the contactless power feeding device 20 can perform first-in first-out of the cart 10, and can preferentially supply the cart 10 having a long charging time to the user.

In addition, the contactless power feeding device 20 includes: belt conveyors 281 and 282 that are provided in the placement portions 24 and convey each of the carts 10 placed on the placement portion 24 in the one direction, and the conveyance control unit 2004 that drives the belt conveyors 281 and 282 to discharge the first cart from the placement portions 24 when receiving the supply instruction of the cart 10. As a result, the user can take out the cart 10 from the placement portion 24 without operating the cart 10 by himself/herself, improving convenience.

In addition, the lock control unit 2003 controls the stoppers 291 and 292 at the first placement position to be in the locked state, and releases the locked state of the stoppers 301 and 302 at the second placement position in a case where the first cart 10 is discharged. As a result, the cart 10 at the second placement position is conveyed in the direction of the first placement position by the belt conveyors 281 and 282. In addition, when the cart 10 is placed on the placement portion 24 at the first placement position, the stoppers 291 and 292 are in a locked state, in a manner that the cart 10 can be prevented from being pushed to the outside of the placement portion 24.

In addition, in a case where the cart 10 is placed at or after the third position, the cart 10 placed at or after the third position is conveyed together with the cart 10 at the second placement position. Therefore, the user can automatically move the cart 10 to the placement portion 24 one cart before without operating the cart 10 by himself/herself.

Furthermore, in a case where the cart 10 is placed at the first placement position, the conveyance control unit 2004 stops driving of the belt conveyors 281 and 282. As a result, the contactless power feeding device 20 does not unnecessarily operate the belt conveyors 281 and 282, and power saving can be achieved.

In addition, the plurality of power transmitting units 21 of the contactless power feeding device 20 according to the present embodiment is installed substantially horizontally to face each power receiving unit 116 in a state where the stoppers 291 and 292 at the first placement position and the front side of the rear wheel support portion BS of the cart 10 placed at the first placement position are in contact with each other, and transmits power in a vertical direction. As a result, even in a case where the positioning unit 241 is not provided, the contactless power feeding device 20 can charge the product registration device 16 of each cart 10 placed on the placement portion 24 at the optimum position.

In addition, the contactless power feeding device 20 according to the present embodiment includes the supply instruction unit 2002 that issues a supply instruction of the cart 10. In a case where a notification indicating that the authentication of the user has succeeded is received from the external device, the supply instruction unit 2002 issues a supply instruction of the cart 10, and when receiving the supply instruction of the cart 10, the lock control unit 2003 brings the stoppers 291 and 292 at the first placement position into the unlocked state and brings the stoppers 301 and 302 at the second placement position into the locked state, and the belt conveyors 281 and 282 convey the cart 10 to supply the cart 10 to the user.

As a result, the contactless power feeding device 20 according to the present embodiment supplies the cart 10 to the user only in a case where a notification indicating that the authentication of the user has succeeded is received from the external device, and thus, it is possible to prevent unauthorized use, theft, and the like of the cart 10 by a person who is not a member.

Although some embodiments of the present invention have been described above, these embodiments have been presented as examples, and are not intended to limit the scope of the invention. These novel embodiments can be implemented in various other forms, and various omissions, substitutions, and changes can be made without departing from the gist of the invention. These embodiments and modifications are included in the scope and gist of the invention, and are included in the invention described in the claims and the equivalent scope.

For example, in the above embodiment, the case where the contactless power feeding device 20 is placed in the cart return has been described. However, the contactless power feeding device 20 may be embedded in the cart return. In a case where the contactless power feeding device 20 is embedded in the cart return, there is no step between the contactless power feeding device 20 and the floor surface, in a manner that the contactless power feeding device 20 may not include the first inclined portion 231 and the second inclined portion 232.

In addition, for example, the contactless power feeding device 20 may be embedded in the cart return in a manner that the upper surface of the placement portion 24 is positioned lower than the floor surface. In this case, the contactless power feeding device 20 may have an inclined surface that goes down from the floor surface to the placement portion 24. In this manner, the contactless power feeding device 20 has the inclined surface that goes down from the floor surface to the placement portion 24, in a manner that the cart 10 can be placed on the placement portion 24 unless the user intentionally pulls out the cart 10.

In addition, for example, in the above-described embodiment, the case where the user who has finished using the cart 10 manually stores the cart 10 in the contactless power feeding device 20 has been described. However, the contactless power feeding device 20 may be configured in a manner that the belt conveyors 281 and 282 are extended to the floor surface in front of the first inclined portion 231 and the contactless power feeding device 20, and the cart 10 is automatically conveyed and stored according to a user's instruction.

In addition, for example, in the above-described embodiment, the case where the stopper is provided at the position where the rear wheels 113 and 114 of the cart 10 are braked has been described. However, the contactless power feeding device 20 may be provided at a position where the front wheels 111 and 112 of the cart 10 are braked. In addition, the stopper may be provided not inside the side surface wheel guiding unit but above the side surface wheel guiding unit.

In addition, a stopper may be provided outside the contactless power feeding device 20 (for example, the iron frame F for aligning the cart 10, or the like), and the cylinder C may protrude toward the contactless power feeding device 20 to brake the rear wheels 113 and 114 of the cart 10.

In the above embodiment, the case where the movement of the cart 10 placed at the first placement position and the second placement position is locked by the stopper has been described. However, a stopper may be provided at a placement position other than the first placement position and the second placement position.

For example, by providing a stopper at the third placement position where the last cart 10 in the Y direction is placed, and causing the cylinder C to protrude to the rear side of the rear wheel support portion BS after a lapse of a predetermined time from when the cart 10 is placed at the third placement position, it is possible to lock the movement of the cart 10 placed at the third placement position in the rear direction.

With such a configuration, it is possible to reliably prevent the user from pulling out the cart 10 that is placed at the end of line and having an insufficient charging time. Furthermore, it is also possible to prevent theft of the cart 10.

Note that, in this case, when the cart 10 is newly placed, the stopper at the third placement position is set to the unlocked state, and the cart 10 placed at the third placement position is moved to the previous placement position. As a result, it is possible to avoid a situation where the cart 10 cannot be placed even though there is a free space in the placement portion 24.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A contactless power feeding device comprising:
    a placement portion on which a plurality of carts, each of which including a device and a power receiving unit that receives power to be fed to the device, is placed in a state of being arranged in one direction;
    a power transmitting unit that is provided at each of a plurality of placement positions at which one of the plurality of carts is placed in the placement portion and transmits power to the power receiving unit of the one of the plurality of carts by contactless power feeding;
    a first lock unit that is provided at a first placement position of the plurality of placement positions at which a first cart is placed, the first cart being one of the plurality of carts arranged top in the one direction, the first lock unit being configured to lock forward movement of the first cart in the one direction;
    a second lock unit that is provided at a second placement position of the plurality of placement positions at which a next cart is placed, the next cart being next one of the plurality of carts following the first cart in the one direction, the second lock unit being configured to lock forward movement of the next cart in the one direction; and
    a control unit that controls an operation of the first lock unit and the second lock unit, wherein
    the control unit releases a locked state of the first lock unit while maintaining a locked state of the second lock unit to allow forward movement of the first cart when receiving a supply instruction to supply one of the plurality of carts placed in the placement portion.

2. The contactless power feeding device according to claim 1, further comprising:
    a conveyance unit that is provided in the placement portion and conveys each of the plurality of carts placed on the placement portion forward in the one direction, wherein
    the control unit drives the conveyance unit to discharge the first cart from the placement portion when receiving the supply instruction.

3. The contactless power feeding device according to claim 2, wherein
    the control unit
        controls the first lock unit to bring the first lock unit into the locked state and releases the locked state of the second lock unit after the first cart has been discharged, and
        stops driving of the conveyance unit when the next cart is placed at the first placement position.

4. The contactless power feeding device according to claim 1, further comprising:
    a third lock unit that is provided at a third placement position of the plurality of placement positions at which a last cart is placed, the last cart being one of the plurality of carts arranged last in the one direction, the third lock unit being configured to lock forward movement of the last cart in the one direction, wherein
    the control unit controls the third lock unit to lock forward movement of the last cart in the one direction after a lapse of a predetermined time when the last cart is placed at the third placement position.

5. The contactless power feeding device according to claim 1, wherein
    the power transmitting unit provided at each of the plurality of placement positions is installed to face the power receiving unit of one of the plurality of carts in a state where the first lock unit and the first cart placed at the first placement position are in contact with each other, and transmits power in a vertical direction.

* * * * *